455-609 AU 233 EX
IP8106 XR 3,676,684

United [redacted]
De Lange

X370-112

[15] 3,676,684
[45] July 11, 1972

[54] FREQUENCY-DIVISION MULTIPLEX COMMUNICATION SYSTEM

[72] Inventor: Owen Edward De Lange, Rumson, N.J.

[73] Assignee: Bell Telephone Laboratories, Incorporated, Murray Hill, N.J.

[22] Filed: Sept. 23, 1970

[21] Appl. No.: 74,768

[52] U.S. Cl. ....................250/199, 179/15 FD
[51] Int. Cl. ....................H04b 9/00
[58] Field of Search ....................250/199; 179/15 FD

[56] References Cited

UNITED STATES PATENTS 3,501,223 3/1970 Rach....................250/199 X

5D

*Primary Examiner*—Robert L. Griffin
*Assistant Examiner*—Kenneth W. Weinstein
*Attorney*—R. J. Guenther and Arthur J. Torsiglieri

[57] ABSTRACT

A frequency-division multiplex communication system is described wherein the multiplexer comprises a plurality of branches, each one of which selectively isolates and modulates one of a plurality of input carrier signals. The modulated signals are either reflected to rejoin the unmodulated carriers or they are separated and combined in a separate output circuit. At the receiver a demultiplexer selectively isolates the several modulated carriers by means of a network similar to the multiplexer, and demodulates them in turn. A repeater, using a demultiplexer-multiplexer pair is also shown.

15 Claims, 7 Drawing Figures

INVENTOR
O. E. DE LANGE
BY Lyman Sherman
ATTORNEY

FREQUENCY-DIVISION MULTIPLEX COMMUNICATION SYSTEM

This invention relates to frequency-division multiplex communication systems.

BACKGROUND OF THE INVENTION

The advent of the laser, as a source of coherent signals at optical frequencies, has made this vast portion of the frequency spectrum available as a carrier of information. The object of the present invention is to utilize the very large bandwidth potential of optical carriers by means of frequency multiplexing techniques.

Multiplexing, as applied to transmission systems, is a means of utilizing the same transmission medium for many different signals. However, in order that the signals be separable at the output end of the transmission medium, each must be uniquely different, in some respect, from all the others. In a frequency-division multiplex system, to which the present invention relates, each signal, or channel of the system, is assigned a discrete portion of the transmitted frequency spectrum. Thus, many relatively narrow bandwidth channels can be accommodated within a single wide bandwidth transmission system.

SUMMARY OF THE INVENTION

In accordance with the present invention, the plurality of different frequency signals is derived from a multifrequency source, such as a multimode laser oscillator. The multiplexer, to which these different frequency carrier signals are coupled, comprises an equal plurality of branches, each of which includes, in cascade: a circulator, comprising a polarization discriminator and a quarter-wave plate; a filter, which passes only one of the signals and reflects all the others; and a signal modulator, which modulates the one signal carrier that is passed by the filter.

In one embodiment of the invention, the modulated signal is reflected following modulation, and recombines with the other reflected carriers such that the output from each branch comprises all of the incident carrier signals, including the modulated carrier. The process of selectively modulating each of the carriers is then repeated in each succeeding branch until all the carriers have been modulated. The combined signal is now ready for transmission over a common transmission medium.

In a second embodiment of a multiplexer, in accordance with the invention, the modulated signals, instead of being reflected, are transmitted through a second filter and a second quarter-wave plate, and are then combined along a common wavepath by means of a second group of polarization discriminators.

At the receiver end of the transmission medium, the process of demultiplexing occurs in which a similar circuit isolates the different modulated carrier signals and detects the modulation.

These and other objects and advantages, the nature of the present invention, and its various features, will appear more fully upon consideration of the various illustrative embodiments now to be described in detail in connection with the accompanying drawings.

DETAILED DESCRIPTION

Figures 1, 4:
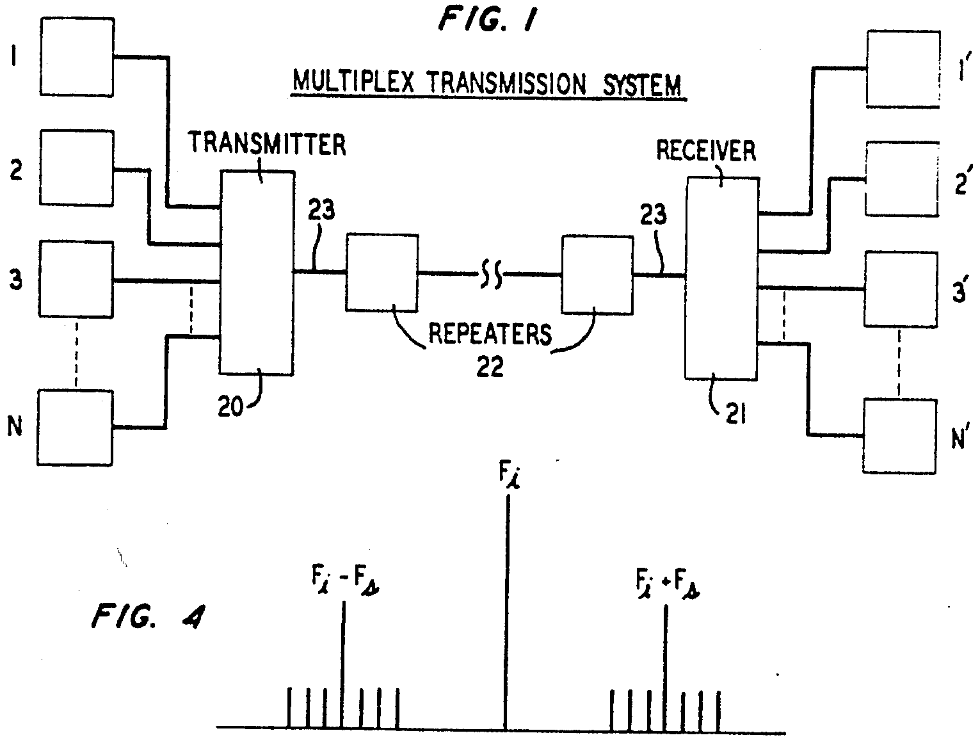
FIG. 1 shows, in block diagram, a multiplex communication system.
FIG. 4, included for purposes of explanation, shows the distribution of sidebands in a subcarrier communication system.

Referring to the drawings, FIG. 1 shows, in block diagram, a multiplex communication system for connecting a plurality of subscribers 1, 2, 3 . . . N to a second plurality of subscribers 1', 2', 3' . . . N' by means of a common transmission path 23. The latter extends between a transmitter 20, which processes the plurality of information signals derived from subscribers 1 through N, and a receiver 21, which separates and recovers the information signals and connects them to subscribers 1' through N'.

Repeaters 22 are distributed along transmission path 23 to provide signal amplification if and as required.

TRANSMITTER

Figure 2:
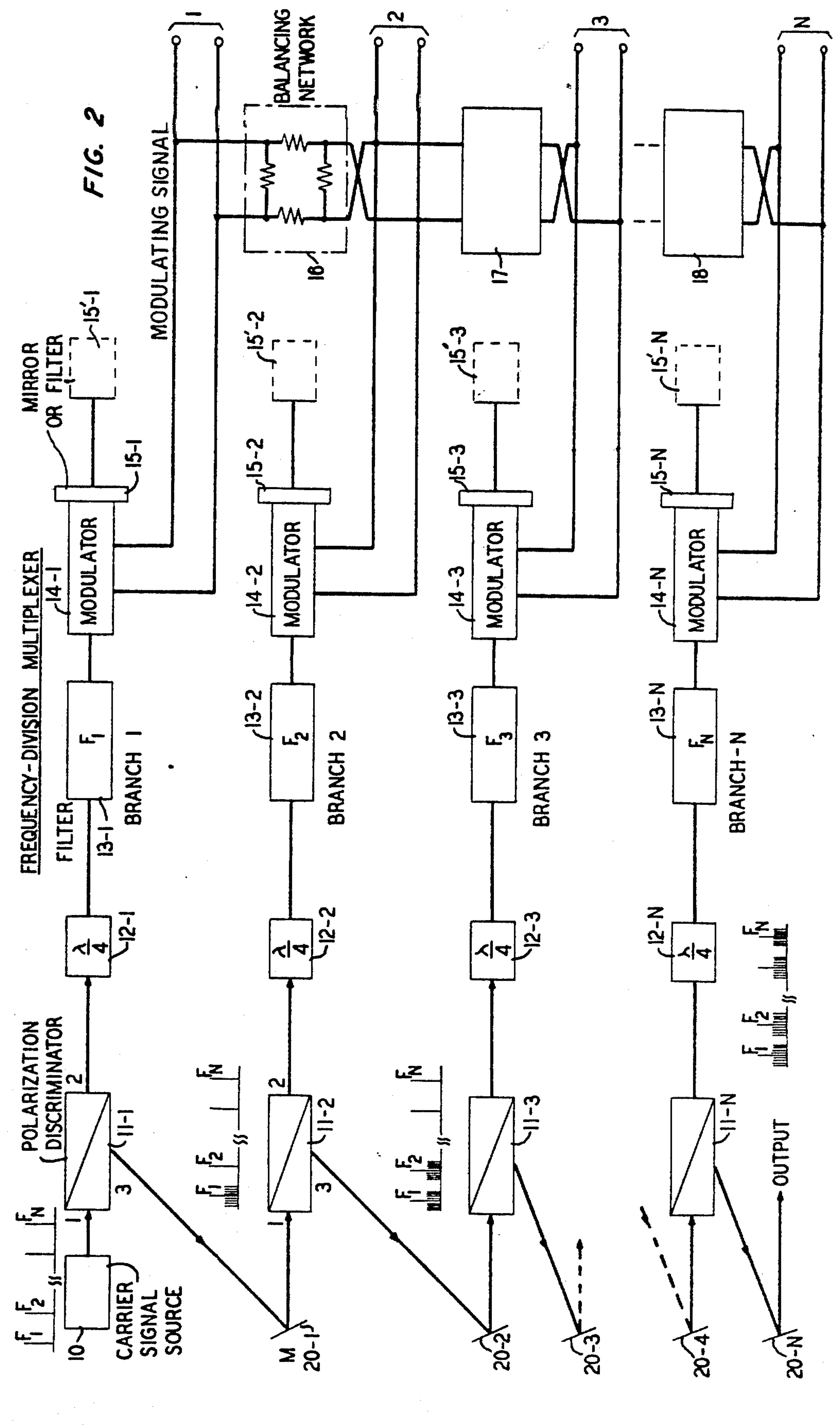
FIG. 2 shows, in block diagram, the details of a first embodiment of a transmitter for use in a frequency-division multiplex communication system.

FIG. 2 shows, in block diagram, the details of a transmitter 20 specifically adapted for use in an optical communication system. In particular, the latter includes a source 10 of carrier signals of different frequencies, and a frequency-division multiplexer. At optical frequencies, source 10 can be an Nd:YAlG laser. Operating in a 15 centimeter long cavity, the laser outputs would typically include at least 15 carrier signals spaced one gigahertz apart.

The laser output is directed into the N-branch multiplexer, where N is equal to the number of signal carriers derived from source 10. Each of the branches comprises, in cascade: polarization discriminator 11, such as a nicol prism 11; a quarter-wave plate 12; and a filter 13, tuned to a different one of the carrier frequencies; a modulator 14; and a mirror 15 or filter 15'.

In operation, all the carrier signals are coupled, successively, into each of the N branches. Upon reaching the filter, all except one of the carriers, are reflected back towards the branch input. The one carrier to which the filter is tuned, is passed by the filter, and enters the modulator, wherein it is modulated by the information signal. Following modulation, it too is reflected back towards the input end of the branch and rejoins all the other reflected carrier signals. The carriers are then coupled into the next successive branch wherein another one of the carriers is separated and modulated in turn.

Referring more specifically to FIG. 2, the input signal, which comprises the composite, multifrequency output of laser source 10, including carrier signals at frequencies $F_1$, $F_2$ . . . $F_N$, is coupled to port 1 of the first polarization discriminator 11–1. Being linearly polarized along a first direction, the carrier signals propagate through discriminator 11–1 and quarter-wave plate 12–1 to filter 13–1, which is tuned to pass frequency $F_1$. All the other frequency signals are reflected by the filter and pass back through the quarter-wave plate a second time, producing a net 90° polarization rotation. As a consequence, the reflected signals are transmitted out of side port 3 of the discriminator onto mirror 20–1, whence they are redirected into the second branch of the multiplexer. (For a more detailed description of polarization discriminators, such as, for example, nicol prisms, and quarter-wave plates, see "Fundamentals of Optics," by F. A. Jenkins and H. E. White, McGraw-Hill Book Company, 1957, page 500 and page 556.)

The signal at frequency $F_1$, which passed through filter 13–1, is modulated by the information coupled to modulator 14–1, and is reflected back upon itself by mirror 15–1. (It will be noted that the modulation sensitivity is doubled by passing the carrier signal through the modulator twice.) The now modulated carrier passes through the filter and quarter-wave plate a second time and returns to discriminator 11–1 whence it, too, is directed out the discriminator side port and, thereby combined with the other carriers. In this way, each carrier is in turn separated from the others, modulated by a different channel information signal and then recombined with the other carriers for transmission along a common wavepath. The carrier signals and the sidebands produced by the modulation process are indicated at the input end of each of the branches and at the output of the multiplexer.

As will be recognized, there can be crosstalk if any adjacent channel carrier signal leaks through one of the filters, since the leakage signal would be modulated by the same information that is applied to the desired carrier signal. Since this leakage component of carrier is then combined with the main signal component, which component carries the desired modulation, it thereafter cannot be separated from it.

To minimize the potential for crosstalk, a multicavity filter, of the type disclosed in the copending application by E. A. J. Marcatili, Ser. No. 750,816, now U.S. Pat. No. 3,589,794, filed Aug. 7, 1968, is advantageously used. A further reduction in the crosstalk can be effected by replacing mirrors 15–1 . . . 15–N, which reflect all the carrier signals equally, with band rejection filters, 15'–1 . . . 15'–N, tuned to reflect only the desired carrier and its side bands, and to transmit any unwanted energy, thereby removing it from within the system. This filter can also be of the type described by Marcatili in his above-identified application.

Since the crosstalk mechanism is very linear and deterministic, a high degree of reduction can be produced by means of balancing networks 16, 17 . . . 18, which couple a small fraction of the information signal between adjacent channels. Thus, for example, any channel 1 modulation impressed upon carrier signal $F_2$, due to leakage past filter 13–1, is canceled by a corresponding fraction of channel 1 signal coupled, out of phase, into branch 2 by means of balancing network 16.

The specifics of modulators 14–1 . . . 14–N will, of course, depend upon the nature of the modulation used. For a discussion of optical modulation generally, see "The Modulation of Laser Light" by D. F. Nelson, published in the June 1968 issue of *Scientific American*.

Figure 3:
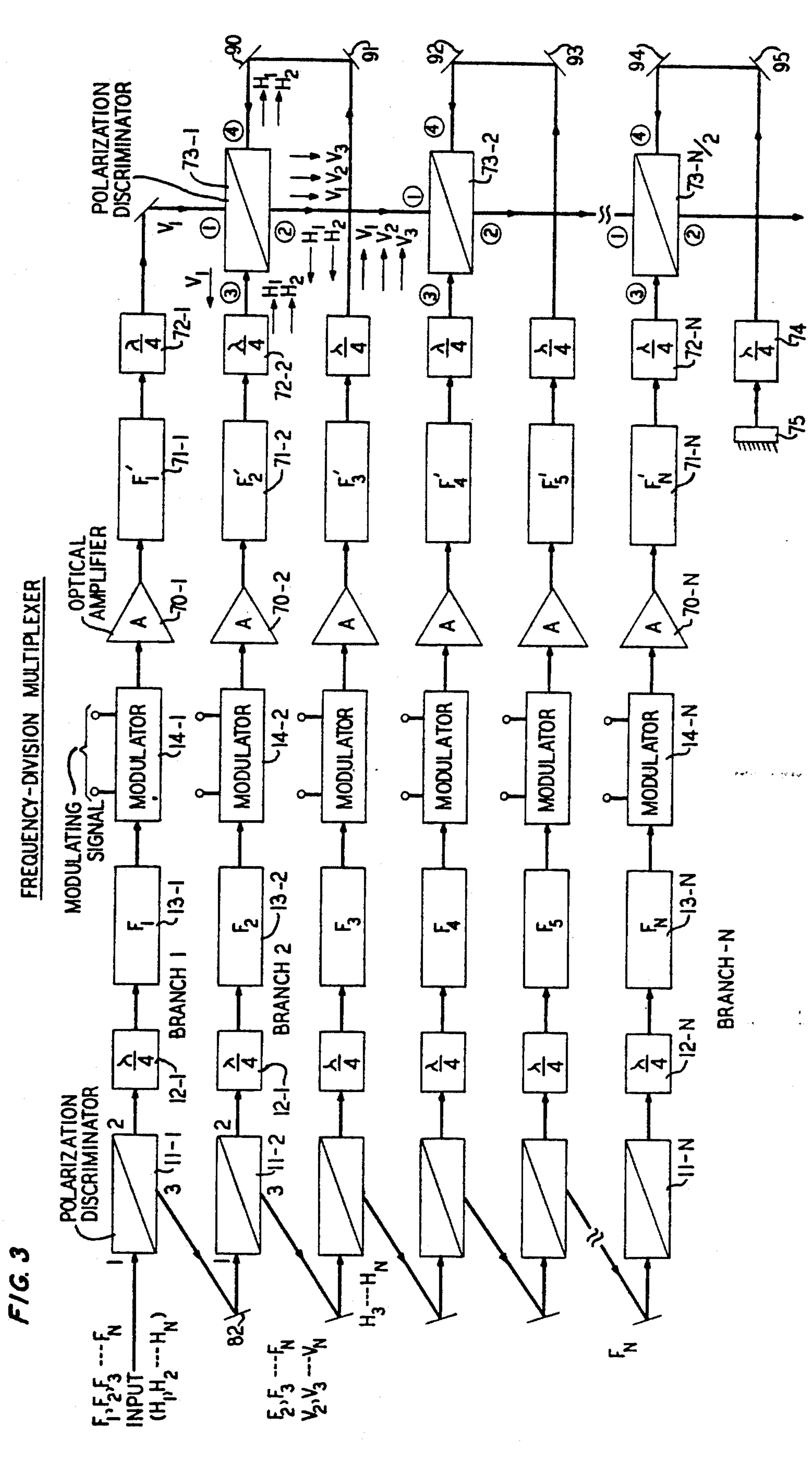
FIG. 3 shows, in block diagram an alternative embodiment of a frequency-division multiplexer.

FIG. 3 shows a second embodiment of a frequency-division multiplexer which differs from the embodiment of FIG. 2 in that the modulated carrier is not reflected back through the modulator so as to rejoin the other carrier signals. To simplify comparing the two embodiments, the same identification numerals are used to identify corresponding components. Thus, the multiplexer comprises a plurality of N branches, each of which includes a polarization discriminator 11; a quarter-wave plate 12; a filter 13, tuned to the frequency of the carrier to be modulated; and a signal modulator 14. The modulated signal, however, is not reflected by either a mirror 15 or a filter 15', as in the embodiment of FIG. 2, but, instead, propagates through a second filter 71 and quarter-wave plate 72, and is combined with other modulated carriers by means of a second group 73 of polarization discriminators. An amplifier 70 is, optionally, included in each branch.

Thus, in operation, a plurality of carrier signals having frequencies $F_1, F_2, F_3 \ldots F_N$ are coupled to discriminator 11–1 of the first branch. The signals propagate through the discriminator and quarter-wave plate 12–1 to filter 13–1, which is tuned to pass carrier $F_1$. All the other signals are reflected back through plate 12–1 and discriminator 11–1 to emerge through side port 3 of the latter, and on to mirror 82. The mirror redirects the reflected carriers into port 1 of discriminator 11–2 in the second branch.

The $F_1$ carrier, after traversing filter 13–1, passes through modulator 14–1 wherein it is modulated by the signal information impressed upon the modulator. The modulated signal is then amplified and passed through a second filter 71–1 and a second quarter-wave plate 72–1, and into port 1 of polarization discriminator 73–1. Simultaneously, a second modulated signal from branch 2 and a third modulated signal from branch 3, obtained in a similar manner, are coupled to opposite ports 3 and 4 of discriminator 73–1.

The combination along a common wavepath of the first group of three channels is explained with reference to the H and V vectors shown in FIG. 3. Before proceeding, however, it should be recalled that polarization discriminators 11 and 73 have the property that they pass waves of one selected polarization between one pair of opposite ports, and deflect waves polarized orthogonally to the one selected polarization into one or the other of a second pair of opposite ports. For purposes of illustration, the input carriers ($F_1, F_2 \ldots F_N$) are assumed to be horizontally polarized, hence the $H_1, H_2, \ldots H_N$ designation for the carrier signals at the input to branch 1. For reasons to be explained more fully hereinbelow, discriminators 73 are oriented to pass horizontally polarized waves and to deflect vertically polarized waves.

Referring again to FIG. 3, the polarization discriminator 11–1 in branch 1 is oriented to pass, between ports 1 and 2, the horizontally polarized input carrier signals, which will now be referred to as signals $H_1, H_2 \ldots H_N$. The $H_1$ signal, which is passed by filter 13–1, is modulated and emerges at the right hand end of branch 1 as a vertically polarized signal, $V_1$, due to its passage through quarter-wave plates 12–1 and 72–1. Similarly, the carriers reflected at filter 13–1 are rotated 90° by virtue of their double passage through quarter-wave plate 12–1. As such, they are deflected to side port 3 of discriminator 11–1 and enter branch 2 as vertically polarized waves $V_2, V_3 \ldots V_N$.

In branch 2, with polarization discriminator 11–2 oriented to pass vertically polarized waves, the process is repeated such that the $V_2$ input signal emerges as a horizontally polarized output signal, $H_2$, at the right hand end of branch 2, while the reflected signals emerge from side port 3 of discriminator 11–2 as horizontally polarized signals $H_3 \ldots H_N$. Of these, the $H_3$ signal is modulated in branch 3 and appears as the vertically polarized signal, $V_3$, at the output end. Thus, polarization discriminator 73–1 has initially applied to port 1 a vertically polarized signal $V_1$; to port 3 a horizontally polarized signal $H_2$; and to port 4 a vertically polarized signal $V_3$.

As indicated above, discriminator 73–1 deflects vertically polarized waves and passes horizontally polarized waves. Hence, signal $V_1$ is deflected and emerges, as indicated, through port 3. After passing through quarter-wave plate 72–2, it is reflected by filter 71–2, passes through plate 72–2 a second time and emerges as a horizontally polarized wave $H_1$. The latter, along with wave $H_2$ pass through the discriminator from port 3 to port 4, from whence they are redirected by mirrors 90 and 91 into quarter-wave plate 72–3. The two waves pass through plate 72–3 a first time, are then reflected back through the plate a second time by filter 71–3, and emerge as vertically polarized waves $V_1$ and $V_2$, along with wave $V_3$. These three waves enter port 4 of discriminator 73–1 and, together, are deflected out through port 2 and into port 1 of the next discriminator 73–2. The process is repeated as often as required, with the signals in the next two branches being added to the signals in the previous branches, until all the modulated signals are combined along a common wavepath.

While the embodiment of FIG. 3 includes more components, it has an advantage over the embodiment of FIG. 2 in that the bandpass filters 13 in the embodiment of FIG. 3 need only pass the unmodulated carriers and, hence, can have a narrower passband than the same filters in the embodiment of FIG. 2, which must also pass the reflected modulated carriers. The ability to use a narrower band filter has the advantage of reducing the potential for crosstalk by minimizing the amount of adjacent channel carrier that can be coupled through the filter. Thus, while filters 13 and 71 are tuned to the same frequency, advantageously, the former have narrower passbands.

The embodiment of FIG. 3 also makes single-sideband, subcarrier operation possible. In this mode of operation, the information signal is used to modulate a first signal, or subcarrier, and the latter, in turn is used to modulate one of the carrier signals $F_1, F_2 \ldots F_N$. This produces a pair of sidebands centered about the modulated carrier $F_i$. As indicated in FIG. 4, the modulation components of the upper sideband are distributed about a frequency $F_i + F_s$, while the modulation components of the lower sideband are distributed about frequency $F_i - F_s$, where $F_s$ is the subcarrier frequency. Since the information in the two sidebands is redundant, only one sideband need be transmitted. Thus, in single-sideband operation, the bandpass filters 71, in the embodiment of FIG. 3, are tuned to pass either frequency $F_i + F_s$ and its sidebands or to pass frequency $F_i - F_s$ and its sidebands, and not to pass the original carrier frequency $F_i$. Obviously, single-sideband operation cannot be conveniently used with the embodiment of FIG. 2 wherein the modulated signals, upon reflection, must pass through the same filters 13 as the incident, unmodulated carriers.

A multiplexer in accordance with the embodiment of FIG. 3 also makes possible an i.f. repeater wherein the received signal is converted to a lower, intermediate frequency signal, and the latter is then used to modulate a locally generated carrier signal. This has the advantage of not requiring that the information signal be recovered at each repeater.

It should be noted that in a single-sideband multiplexer, the rejected sideband and the rejected carrier are reflected back towards amplifiers 70. Accordingly, means, such as an isolator or a circulator are advantageously inserted between amplifiers 70 and filters 71 in order to remove this energy from the system. At optical frequencies, a circulator comprising a nicol prism disposed between a pair of quarter-wave plates can be used in the multiplexer of FIG. 3. If such a component is included, however, it may also rotate the polarization of the modulated output signals applied to polarization discriminators 73° by 90°. Except for this indicated change in polarization direction, the operation of the output discriminators is as described hereinabove.

RECEIVER

Having modulated each of the different frequency carrier signals, and having directed them along a common transmission path, the combined signals propagate together and are received at the output end of the system. It is the function of the receiver to isolate the different carriers and to recover the information by an appropriate detection process.

Figure 5:
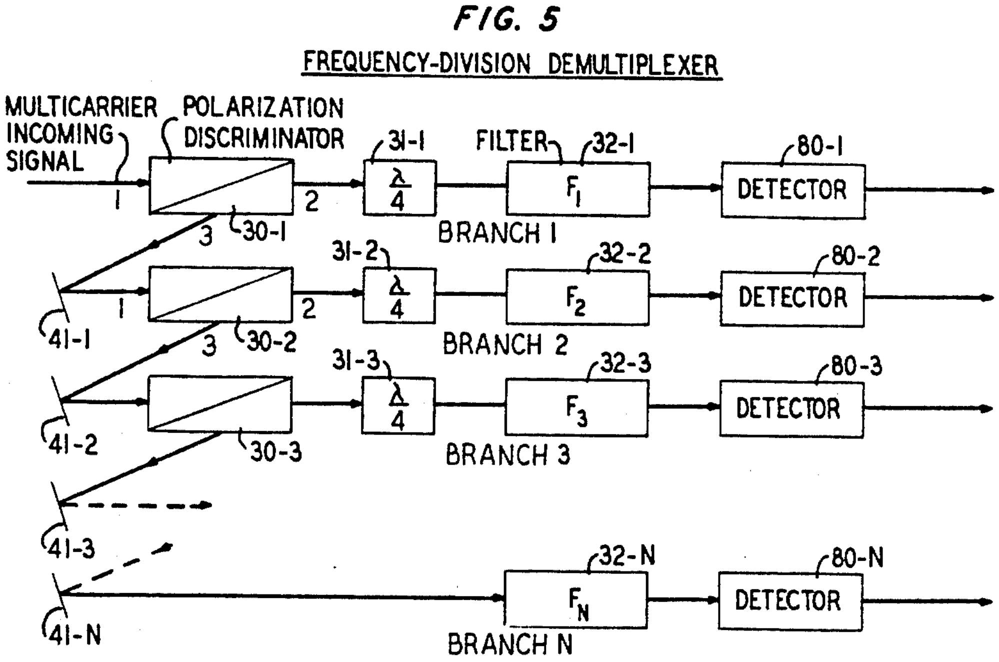
FIG. 5 shows, in block diagram, a first embodiment of a receiver for use in a frequency-division multiplex communication system.

FIG. 5 shows, in block diagram, the details of a first embodiment of receiver 21. In general, the receiver is very similar to the transmitter, including means for selectively separating one carrier at a time. However, whereas the transmitter modulated the isolated carrier, in the receiver the modulation previously impressed upon the carrier, is recovered by a suitable detection process. Accordingly, each of the first N–1 branches in the demultiplexer comprises, in cascade: a circulator, including a polarization discriminator and a quarter-wave plate; a bandpass filter, tuned to pass a different one of the modulated carriers; and a signal detector. In the last, or $N^{th}$ channel, since only one channel remains, only a bandpass filter and detector are included.

Referring more specifically to FIG. 5, the composite, multicarrier incoming signal is coupled to the first branch of the receiver comprising: discriminator 30–1; quarter-wave plate 31–1; filter 32–1; and detector 80–1. Since the filter is tuned to pass only carrier $F_1$ and its sidebands, all the other carriers are reflected back through side port 3 of discriminator 30–1 and onto a mirror 41–1, which redirects them to the second receiver branch wherein the process is repeated. The passed carrier is demodulated in detector 80–1 and the modulation information directly recovered. The form of the detector will, of course, depend upon the type of modulation employed. In an amplitude modulated, optical system, a photodiode can be used to recover the modulation information.

In a single-sideband subcarrier system, bandpass filters 32 will be tuned to one of the sidebands, $F_i \pm F_s$, for the reasons explained hereinabove. In a double-sideband subcarrier system, filters 32 must be wide enough to pass both subcarrier sidebands.

Figure 6:
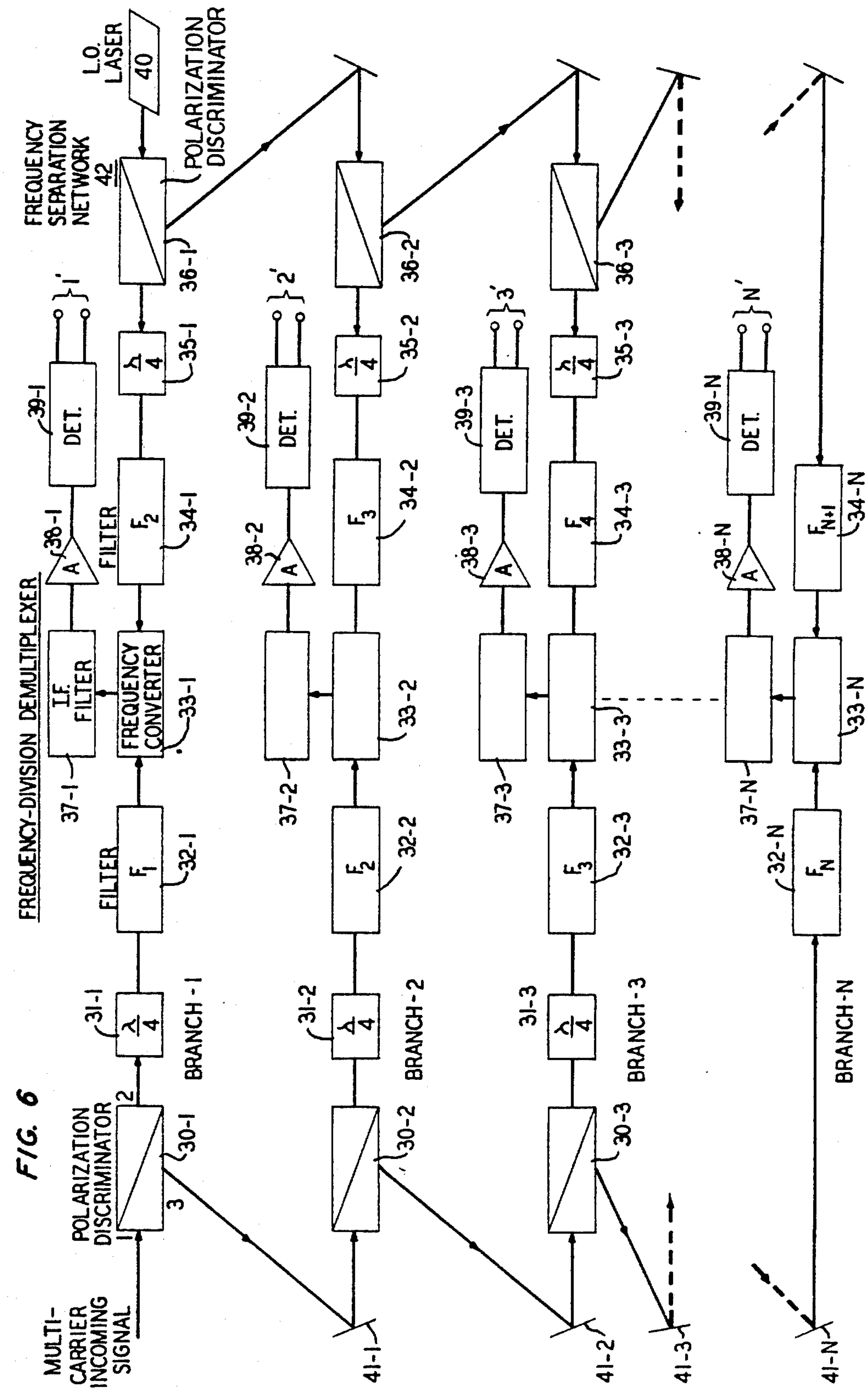
FIG. 6 shows, in block diagram, an alternate embodiment of a receiver.

FIG. 6 shows an alternate embodiment of receiver 21 wherein the carriers are coupled into a frequency converter, along with a local oscillator signal, to produce an intermediate frequency signal which can then be filtered and amplified prior to detection. Using the same identification numerals as in FIG. 5 for common components, each of the first N–1 branches includes: a polarization discriminator 30; a quarter-wave plate 31; and a bandpass filter 32. The $N^{th}$ branch includes only a bandpass filter 32–N.

The output from filters 32 are coupled to frequency converters 33, along with a local oscillator signal, to produce intermediate frequency signals. The latter are then filtered, amplified and demodulated by means of intermediate frequency filters 37; amplifiers 38; and detectors 39.

In an optical system, the local oscillator signal is conveniently supplied by a multimode laser in much the same way that the carriers were supplied at the transmitter. Thus, a common local oscillator laser 40, substantially identical to laser 10 at the transmitter, is coupled to a frequency separating network 42 substantially identical to the channel separating arrangement used to separate the incoming channels. Thus, network 42 comprises a plurality of N branches, each of which includes: a polarization discriminator 36; a quarter-wave plate 35; and a bandpass filter 34, tuned to pass one of the plurality of local oscillator laser output frequencies. The filter, however, is tuned to pass a different frequency than the corresponding branch filter 32. Specifically, if the intermediate frequency is chosen to be equal to the mode-separation frequency, $\Delta f$, of the laser, each of the filters 34–1 . . . 34–N is tuned to a frequency $F_1 \pm \Delta f \ldots F_N \pm \Delta f$, respectively. Thus, as indicated in FIG. 6, filter 32–1 of the first channel is tuned to frequency $F_1$, whereas filter 34–1 is tuned to $F_2 = F_1 + \Delta f$.

The pairs of signals derived from filters 32–1 . . . 32–N and filters 34–1 . . . 34–N are coupled, respectively, to frequency converters 33–1 . . . 33–N, which, for example, can be photodiodes, wherein the intermediate frequency, $\Delta f$, i.e., the difference frequency signal, is produced. The latter is then coupled through conventional i.f. filters 37–1 . . . 37–N, and amplifiers 38–1 . . . 38–N, to detectors 39–1 . . . 39–N. The specific features of the detectors will depend, of course, upon the particular modulation employed at the transmitter. The recovered information signals 1' . . . N' are available at the output of the detectors and can then be employed as required by the system.

It is an advantage of the receiver of FIG. 6 that the additional filtering provided by filters 37 tends to reduce the potential for crosstalk.

MODULATION

As indicated earlier, the frequency-division multiplex system described hereinabove is capable of operating with any one of the many known types of modulation. Thus, the channel information can be applied to the individual optical carriers by means of analog or digital amplitude modulation, phase modulation, frequency modulation, polarization, or any other type of modulation. The information can be directly impressed upon the optical carrier or, alternatively, the information can first be impressed upon a subcarrier, and the modulated subcarrier used, in turn, to modulate the optical carriers.

REPEATERS

Figure 7:
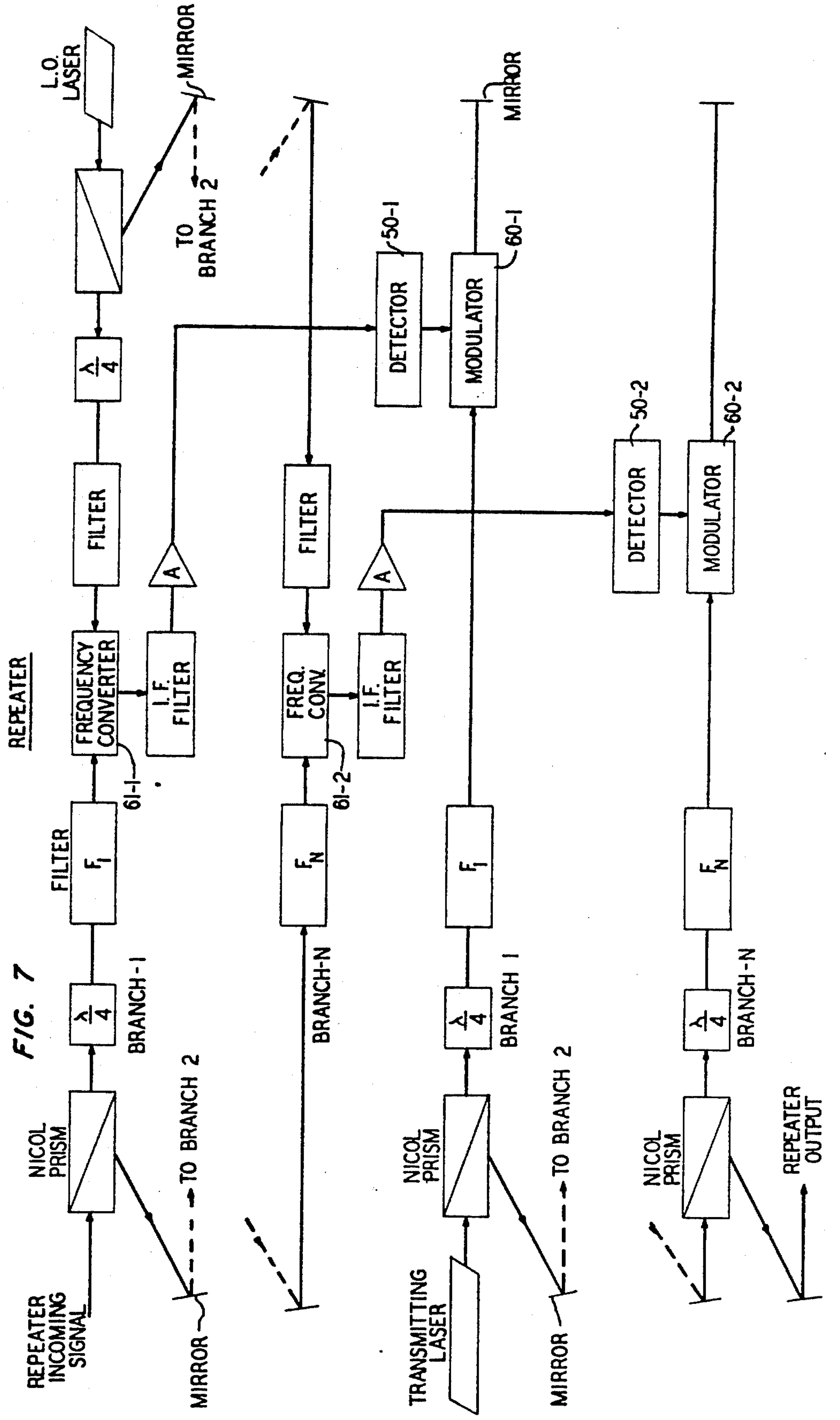
FIG. 7 shows, in block diagram, a repeater for use in a frequency-division multiplex communication system.

FIG. 7 shows, in block diagram, a repeater for a frequency-division multiplex system. Basically, it comprises a receiver of the type shown in FIG. 6 and a transmitter of the type shown in FIG. 2, with the receiver output signals being used to modulate the transmitter modulators. Thus, the output from receiver detector 50–1 is coupled to transmitter modulator 60–1. Similarly, detector 50–2 is coupled to modulator 60–2. In all other respects, the repeater operation is the same as described above in connection with FIGS. 6 and 2. In a subcarrier system, detectors 50 are omitted and the intermediate frequency signals generated in converters 61 are coupled directly to modulators 60.

It will be recognized that the specific arrangements shown are merely illustrative of but a small number of the many possible embodiments which can represent applications of the principles of the invention. For example, the combination of polarization discriminators and quarter-wave plates used herein are basically circulators. Obviously, other types of circulators can be used to perform the indicated function. See, for example, "Circulators for Optical Radar Systems" by T. C. Fletcher and D. L. Weisman, *Applied Optics*, July 1965, pp. 867–873. Thus, numerous and varied other arrangements can readily be devised in accordance with these principles by those skilled in the art without departing from the spirit and scope of the invention.

I claim:

1. A frequency-division multiplex communication system including:
 a transmitter;
 a receiver; and
 a transmission path connecting said transmitter to said receiver;
 characterized in that said transmitter includes a multiplexer having a plurality of branches, each adapted to modulate one of a plurality of carrier signals and each comprising, in cascade:
 a circulator for coupling incident wave energy between a first and a second port, and for coupling reflected wave energy between said second and a third port;
 a filter, coupled to said second port and tuned to pass one of said carriers and to reflect all the other of said carriers;
 a modulator for modulating the carrier passed by said filter;
 means for reflecting said modulated carrier back through said filter to said circulator along with the other of said carriers;
 means for coupling said reflected carriers derived from the third port of said circulator into the next adjacent branch; and
 means at the output of the last of said branches for directing said carriers along said transmission path; and
 further characterized in that said receiver includes a demultiplexer having a plurality of branches, each adapted to separate and detect a different one of a plurality of modulated carriers;
 each of the first N–1 branches of said demultiplexer comprising, in cascade:
 a circulator for coupling incident wave energy between a first and a second port, and for coupling reflected wave energy between said second and a third port;
 a filter, coupled to said second port, tuned to pass one of said modulated carriers;
 the last branch of said demultiplexer including a filter, tuned to pass the $N^{th}$ modulated carrier;
 means coupled to each of said filters for demodulating said passed carrier; and
 means at the input end of said branches for redirecting the reflected carriers derived from the third port of said circulator into the next adjacent branch.

2. In an optical communication system, a frequency-division multiplexer comprising:
 a plurality of branches, each adapted to modulate one of a plurality of carrier signals;
 each of said branches including in cascade:
 a polarization discriminator;
 a quarter-wave plate;
 a filter tuned to pass one of said carriers and to reflect all the other of said carriers;
 a modulator for modulating the carrier passed by said filter;
 means for reflecting said modulated carrier back through said modulator, filter and quarter-wave plate and into said polarization discriminator, along with the other of said carriers;
 means for coupling said reflected carrier signals into the next adjacent branch; and
 means at the output of the last of said branches for directing said carriers along a common wavepath.

3. The multiplexer according to claim 2 wherein said reflecting means is a mirror.

4. The multiplexer according to claim 2 wherein said reflecting means is a band-reject filter tuned to reflect said modulated carrier and to transmit said other carriers out of said multiplexer.

5. The multiplexer according to claim 2 wherein said discriminator is a nicol prism.

6. The multiplexer according to claim 2 including a multifrequency optical source.

7. The multiplexer according to claim 6 wherein said source is a laser.

8. In an optical communication system, a frequency-division multiplexer comprising:
 a plurality of branches, each adapted to modulate one of a plurality of carrier signals;
 each of said branches, including in cascade:
 a polarization selective member;
 a first quarter-wave plate;
 a first filter tuned to pass one of said carriers and to reflect all the other of said carriers;
 a modulator for modulating the carrier passed by said filter;
 a second filter;
 a second quarter-wave plate;
 means at the output ends of said branches for combining along a common wavepath the signals passed by the second filters; and
 means at the input ends of said branches for redirecting the carrier signals reflected by the first filter in the respective branches into the next adjacent branch.

9. The multiplexer according to claim 8 including an amplifier in each of said branches.

10. The multiplexer according to claim 9 wherein the second filter in each of said branches is tuned to pass the modulated carrier and its sidebands.

11. The multiplexer according to claim 9 wherein the second filter in each of said branches is tuned to pass only a single sideband, and to reflect the carrier and its other sideband.

12. In an optical communication system, a frequency-division demultiplexer for separating a plurality of modulated carriers comprising:
 a plurality of branches, each of the first N–1 branches including in cascade:
 a polarization discriminator;
 a quarter-wave plate;
 a filter, tuned to pass one of said modulated carriers and to reflect all the other of said modulated carriers;
 the last branch of said demultiplexer including only a filter tuned to pass the $N^{th}$ carrier;
 means coupled to each of said filters for demodulating said passed carrier; and
 means at the input end of said branches for redirecting the reflected carriers into the next adjacent branch.

13. The demultiplexer according to claim 12 wherein said demodulating means is a detector.

14. The demultiplexer according to claim 12 wherein said demodulating means comprises:
 a frequency converter;
 means for coupling a local oscillator signal to said frequency converter to produce an intermediate frequency signal;
 means for filtering said intermediate frequency signal; and
 means for detecting the modulation impressed upon said intermediate frequency signal.

15. The demultiplexer according to claim 14 wherein the local oscillator signals coupled to said converters are derived from a common, multifrequency signal source.

* * * * *